United States Patent
Pan et al.

(10) Patent No.: US 11,523,590 B2
(45) Date of Patent: Dec. 13, 2022

(54) METHOD AND SYSTEM FOR MONITORING EGG-LAYING PERFORMANCE OF CAGED LAYING-HENS AT LAYING-HEN POSITIONS

(71) Applicant: ZHEJIANG UNIVERSITY, Hangzhou (CN)

(72) Inventors: Jinming Pan, Hangzhou (CN); Yifan Liu, Hangzhou (CN); Chenghao Pan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/607,422

(22) PCT Filed: May 22, 2020

(86) PCT No.: PCT/CN2020/091728
§ 371 (c)(1),
(2) Date: Oct. 29, 2021

(87) PCT Pub. No.: WO2021/073092
PCT Pub. Date: Apr. 22, 2021

(65) Prior Publication Data
US 2022/0217951 A1 Jul. 14, 2022

(30) Foreign Application Priority Data
Jan. 19, 2020 (CN) .......................... 202010063068.X

(51) Int. Cl.
*A01K 31/16* (2006.01)
*A01K 29/00* (2006.01)
*G06M 1/272* (2006.01)

(52) U.S. Cl.
CPC .......... *A01K 31/165* (2013.01); *A01K 29/005* (2013.01); *G06M 1/272* (2013.01)

(58) Field of Classification Search
CPC ...... A01K 31/14; A01K 31/16; A01K 31/165; A01K 29/00; A01K 29/005
See application file for complete search history.

(56) References Cited

U.S. PATENT DOCUMENTS

| 2016/0217561 A1 | 7/2016 | Phillips et al. | |
| 2019/0012497 A1* | 1/2019 | Ralston | A01K 11/006 |
| 2020/0260695 A1* | 8/2020 | Rosales | C02F 9/005 |

FOREIGN PATENT DOCUMENTS

| CN | 1868610 A | 11/2006 |
| CN | 1934935 A | 3/2007 |

(Continued)

*Primary Examiner* — Monica L Perry
*Assistant Examiner* — Aaron M Rodziwicz
(74) *Attorney, Agent, or Firm* — Bayramoglu Law Offices LLC

(57) ABSTRACT

A method and system for monitoring the egg-laying performance of caged laying-hens at laying-hen positions are provided. A plurality of coops are disposed side by side, a conveyor belt is disposed below the plurality of coops, and a machine-vision inspection device having a CCD camera and a lighting device is provided on an output end of the conveyor belt. Eggs laid by the hens fall onto the conveyor belt from the bottom of the coops. After all eggs are laid, the conveyor belt is activated to convey the eggs to the machine-vision inspection device, and the CCD camera is triggered to capture an image of a surface of the conveyor belt carrying the eggs.

11 Claims, 3 Drawing Sheets

(56) References Cited

FOREIGN PATENT DOCUMENTS

| | | | | |
|---|---|---|---|---|
| CN | 101073312 | A | 11/2007 | |
| CN | 201804337 | U | 4/2011 | |
| CN | 206469966 | U | 9/2017 | |
| CN | 107232088 | A | 10/2017 | |
| CN | 111134047 | A | 5/2020 | |
| JP | 2011209183 | A | 10/2011 | |
| KR | 101656265 | B1 | 9/2016 | |
| KR | 101851169 | B1 | 6/2018 | |
| WO | WO-9635327 | A1 * | 11/1996 | ............. A01K 31/16 |
| WO | 2018198922 | A1 | 11/2018 | |

* cited by examiner

METHOD AND SYSTEM FOR MONITORING EGG-LAYING PERFORMANCE OF CAGED LAYING-HENS AT LAYING-HEN POSITIONS

CROSS REFERENCE TO THE RELATED APPLICATIONS

This application is the national phase entry of International Application No. PCT/CN2020/091728, filed on May 22, 2020, which is based upon and claims priority to Chinese Patent Application No. 202010063068.X, filed on Jan. 19, 2020, the entire contents of which are incorporated herein by reference.

TECHNICAL FIELD

The present disclosure relates to a method and system for poultry detection, and in particular, to a method and system for automatically counting the quantity of eggs of caged laying-hens and monitoring the egg-laying performance at laying-hen positions.

BACKGROUND

As a commonly-used method for large-scale laying-hen farming, cage breeding has the advantage of allowing eggs to be transferred to a conveyor belt and then to an egg collection area in a centralized manner. In practical breeding, the quantity, weight, and color of the eggs represent an important basis for determining the egg-laying performance and the health status of the laying-hens. A normal laying-hen generally has specific egg-laying performance. When it is found that the egg quantity, weight, and color of laying-hens at a certain position change significantly, it often indicates a change in the egg-laying performance of the laying-hens at the position. This change may be a sign of the existence of sub-healthy, sick, or dead laying-hens at this position. For example, when a laying-hen is transferred to a laying-hen house, its weight at this time has the greatest impact on the egg weight at an early stage. If a laying-hen exhibits excessive fat accumulation at the beginning of egg-laying, it will be difficult for the laying-hen to lay eggs, resulting in a reduced quantity of laid eggs. Therefore, it is necessary to control the weight of the hens during breeding. In addition, different ages of egg-laying hens also affect the egg weight. Generally, an egg from a primiparous laying-hen is lighter while an egg from a multiparous laying-hen is heavier. As the age of the laying-hen increases, the egg weight increases, but the eggshell quality decreases. Therefore, based on the egg weight and quantity, with reference to an actual age of the hen, the protein level in the daily diet can be reduced at a later stage of egg-laying to limit weight growth of the hen and improve the eggshell quality.

Moreover, many nutritional factors can affect the egg size. Particularly, water supply and energy, protein and linoleic acid levels in the feed have great impact on the egg weight and size. Adequate water supply is critically important to ensure the egg-laying performance and the egg size of the hen. An egg has a water content of about 65%, and 340 ml of water is required for each hen to lay one egg. A minor change in the water intake will greatly affect the egg weight. Especially when the hen is at the peak of egg-laying, or in hot summer, the water supply becomes more important. Once the water supply is insufficient, the egg production and the egg weight inevitably decrease. Therefore, a decrease in the egg-laying performance directly indicates insufficient water supply or nutrition level of the feed as a reminder for the breeder. Hence, by monitoring the egg-laying performance of caged laying-hens, the breeder can know the health status of the laying-hens, thereby adjusting their diets and increasing their immunity, while finding and isolating sick and dead laying-hens in time.

At present, the egg-laying performance of laying-hens is typically observed and recorded manually, that is, breeders inspect and record the egg-laying situation at each position in the hen house. This method is time-consuming and laborious, and cannot accurately and comprehensively determine the egg-laying performance of the caged laying-hens.

SUMMARY

To overcome the deficiency of manually observing and recording egg-laying performance of laying-hens in the background art, the present disclosure aims to provide a method and system for automatically counting eggs and monitoring the egg-laying performance for caged laying-hens.

A quantity of eggs passing through a device and their colors, shapes and sizes are obtained by using a computer vision technology. A weight of each egg is estimated by using an egg shape and size-weight model, an egg-laying position (each partition of a coop) of a laying-hen is calculated based on arrival time, and egg-laying performance of all laying-hens in the coop is obtained in combination with a conveyor belt.

Technical solutions used in the present disclosure are as follows:

1. A method for monitoring the egg-laying performance of caged laying-hens at laying-hen positions includes:

disposing a plurality of coops side by side, and disposing a conveyor belt below the plurality of coops, where a conveying direction of the conveyor belt is along a direction of disposing the plurality of coops side by side, a machine-vision inspection device is secured on an output end of the conveyor belt, a charge-coupled device (CCD) camera and a lighting device are installed in the machine-vision inspection device, both the CCD camera and the lighting device are located above the conveyor belt and face the conveyor belt, a motor drives the conveyor belt to run, an output terminal of the motor is connected to a conveyor pulley at one end of the conveyor belt, and the motor and the CCD camera are connected to a computer; and allowing eggs laid by hens in the coops to fall onto the conveyor belt from the bottom of the coops, and after the hens in the coops have laid all eggs, activating the conveyor belt, recording the time of activating the conveyor belt, and conveying, by the conveyor belt, the eggs to the machine-vision inspection device; and after the eggs enter the machine-vision inspection device, triggering the CCD camera to capture an image of a surface of the conveyor belt carrying the eggs, obtaining contours of the eggs in the image through image processing, statistically counting a quantity of the eggs, and obtaining a coop position, a color, a size, and a weight for each egg through further analysis and processing, to realize real-time monitoring.

Further, a quantity of eggs at each coop position, a weight of each egg, a color of each egg, and other information may be compared with egg-laying information under a normal condition to finally obtain the egg-laying performance and health status of laying-hens at each coop position.

Further, the method further includes: when the conveyor belt is activated, starting the CCD camera to collect the image, detecting the contours of the eggs through real-time image analysis and processing, numbering an egg when it is detected that the egg reaches a middle position of the image, and recording a current time to as an egg arrival time; and when it is detected that an $n^{th}$ egg passes by, obtaining a coop position x of the $n^{th}$ egg based on the egg arrival time to according to the following formula:

$$x = \left\lceil \frac{v \cdot (t_n - t_0)}{L} \right\rceil$$

where v represents a running speed of the conveyor belt, L represents a length of a single coop, to represents the initial running time of the conveyor belt, and ⌈ ⌉ represents rounding up.

Further, the method further includes: obtaining, by using the CCD camera, a video stream, extracting each frame as an original image for processing, converting RGB color space of the image into a V component in YUV color space, performing noise reduction on the image, and then performing background segmentation and binarization by the Otsu's method, to determine whether there is an egg: if the image is completely black, determining that there is no egg, or if the image is not completely black, determining that there is an egg;

extracting an Otsu image containing an egg, and performing erosion for b times using an a*a elliptical kernel;

performing a judgement on an eroded image by the following step: if each gray value of a 3*3 central pixel region of the image is not 0, selecting and extracting a bounding rectangle whose gray value is not 0 as a local image region; and performing dilation on the local image region for b times by using the same a*a elliptical kernel, to obtain an intermediate image E; and obtaining shape and size information of the intermediate image E by the following steps: processing the intermediate image E by using a minimum bounding rectangle (MBR) method, to establish an MBR of a contour of the egg, using a major axis and a minor axis of the MBR as a major axis and a minor axis of the egg, respectively, to obtain lengths of the major axis and the minor axis of the egg, obtaining an edge contour of the egg image by using a cv2.find Contours( ) function of openCV, denoting the current image as an image F, extracting a perimeter of the egg by using a cv.arcLength( ) function, and obtaining area of the egg by using a cv.contourArea( ) function; and inputting the lengths of the major axis and the minor axis, the perimeter, and the area of the egg into the following egg shape and size-weight estimation model, to obtain a weight of the egg:

$$W = \rho h^2 l + \mu(C - 2l)hl + \tau Sh + \psi$$

where W represents the estimated weight of the egg; h represents the length of the minor axis of the egg; l represents the length of the major axis of the egg; C represents the obtained perimeter of the egg, S represents the obtained area of the egg; and $\rho$, $\mu$, $\tau$, and $\psi$ represent model parameters of the first term, the second term, the third term, and the fourth term, respectively, where the parameters are obtained through fitting after an experimental test based on data of a type of eggs, and can only be used for this type of eggs.

Further, the method further includes the following: performing pixel-wise multiplication on the intermediate image E and the original image Frame, extracting a region of the egg in the image, obtaining color information of the egg, and then performing color recognition based on the color information of the egg in the HSV color space to realize color grading.

Further, the method further includes the following: determining normal egg-laying parameters based on a known egg-laying condition, comparing a quantity of eggs at each coop position x, a weight of each egg, and a color of each egg with the normal egg-laying parameters, and then monitoring the egg-laying performance of the laying-hen at each position, to determine the egg-laying performance and the health status of the laying-hens at each coop position.

The conveyor belt runs at a constant speed.

2. A system for monitoring the egg-laying performance of caged laying-hens at laying-hen positions is provided, including:

a coop, a conveyor belt, a machine-vision inspection device, a CCD camera, and a motor, where the coop is located above the conveyor belt, the conveyor belt is configured to receive and convey eggs, the eggs laid by the hens in the coop fall onto the conveyor belt from the bottom of the coops, and are conveyed along the conveyor belt, the motor is installed at one end of the conveyor belt, the machine-vision inspection device is secured above a tail end of an output side of the conveyor belt, the machine-vision inspection device includes a semi-closed camera obscura, an opening at a lower end of the semi-closed camera obscura covers the tail end of the output side of the conveyor belt, an inner top surface of the semi-closed camera obscura is provided with the CCD camera and a lighting device, a front end and a rear end, along a conveying direction of the conveyor belt, of the semi-closed camera obscura is provided with an egg inlet and an egg outlet, respectively, and the eggs are conveyed by the conveyor belt to freely enter and leave the machine-vision inspection device through the inlet and the outlet.

The CCD camera of the machine-vision inspection device and the motor are connected to the computer.

A lens of the CCD camera faces directly downward for capturing an image of a surface of the conveyor belt; and the lighting device adopts a ring light source, and the CCD camera is located in a center of the ring light source.

A plurality of coops are disposed along the conveying direction of the conveyor belt.

In the present disclosure, one conveyor belt is disposed below each layer of coops to convey eggs from each position to a collection region, one inspection device is secured in a region above the tail end of the conveyor belt, one CCD camera is installed on an inner top surface of the device, and the motor and the CCD camera are connected to the computer. During running, the motor drives the conveyor belt to run. The computer records the time of activating the motor and establishes a separate folder and table to record data. After that, the conveyor belt conveys the eggs to the inspection device (directly below the CCD camera), the CCD camera is triggered to obtain images and arrival time of the eggs in the device, image processing is performed to count and number the eggs, color information of the eggs is obtained, weights of the eggs are predicted by using an egg shape and size-weight estimation model, and an egg-laying position and other information of a laying-hen are calculated based on time required for arrival of an egg and a speed of the conveyor belt. Based on changes of an egg quantity, an egg weight, and an egg color every day in each egg-laying position, egg-laying performance status at a laying-hen position is monitored.

The present disclosure can be completed based on an existing egg conveyor belt of a laying-hen coop, to accurately obtain an egg quantity, an egg weight, an egg color, and other information for a laying-hen at each coop/position, and compare the obtained information with egg-laying performance of the laying-hen under a normal condition, to obtain a health status of the laying-hen.

The present disclosure has the following beneficial effects:

1. The system can be installed based on the existing conveyor belt of the coop, and only one machine vision device needs to be secured, thereby saving costs of breeding devices.

2. The system is activated at fixed time during breeding, to obtain egg-laying performance of the laying-hen in each coop accurately and in time, thereby reducing a demand for labor in a laying-hen house.

3. Based on the egg-laying performance (egg quantity, egg weight and egg color) at each position under the normal condition, the health status of the laying-hen can be determined to reflect whether there is a problem in diet and immunity, or whether there is a sick or dead hen at this position.

The present disclosure can be used to monitor egg-laying performance of caged laying-hens at laying-hen positions.

Figure 1:
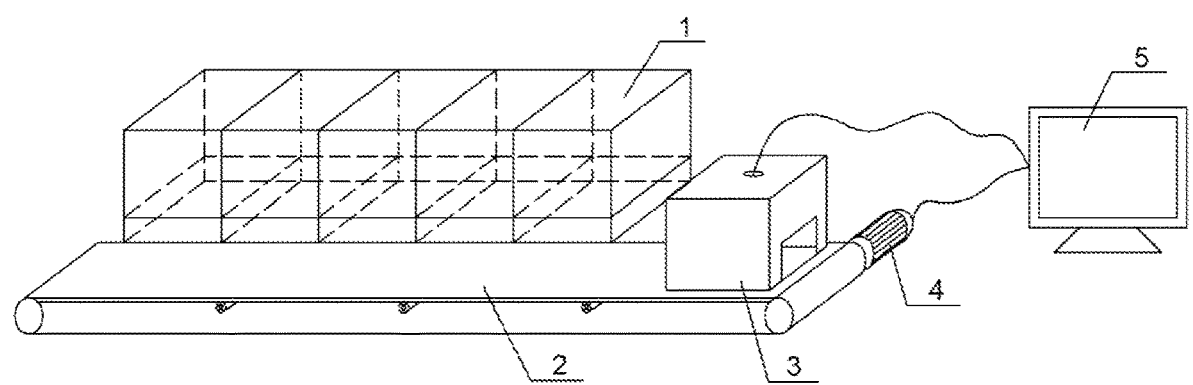
FIG. 1 is a schematic structural diagram of a system according to the present disclosure.

Reference numerals in the figures, 1: coop; 2: conveyor belt; 3: machine-vision inspection device; 4: motor; 5: computer, 6: semi-closed camera obscura; 7: CCD camera; 8: lighting device.

DETAILED DESCRIPTION OF THE EMBODIMENTS

The present disclosure is further described below with reference to the accompanying drawings and embodiments.

Figure 2:
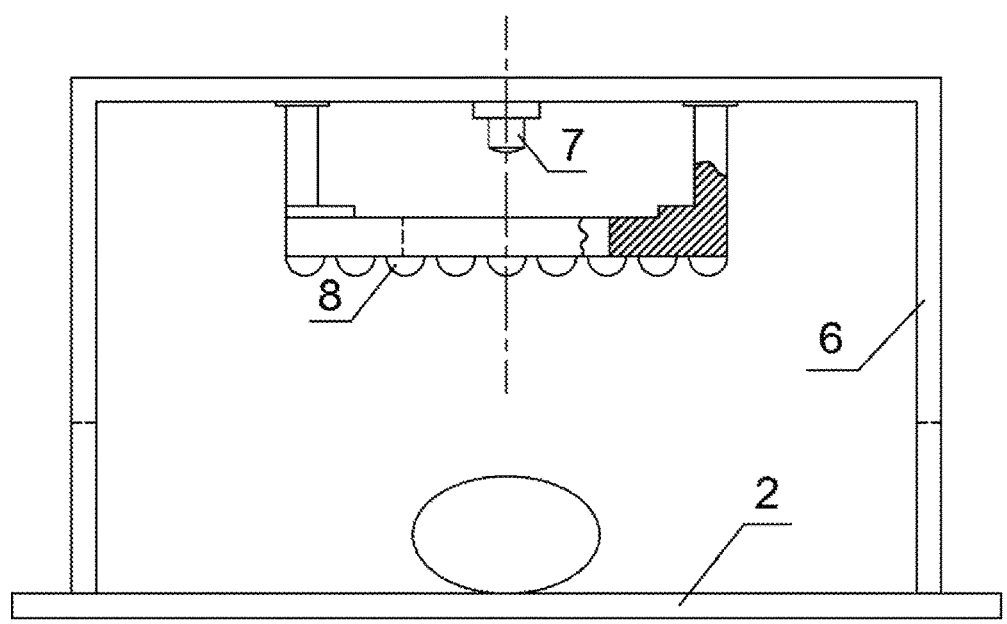
FIG. 2 is a schematic diagram of a machine-vision inspection device according to the present disclosure.

As shown in FIG. 1 and FIG. 2, a system in specific implementation includes a coop 1, a conveyor belt 2, a machine-vision inspection device 3, a CCD camera 7, and a motor 4. The coop 1 is located above the conveyor belt 2. The conveyor belt 2 is installed below the coop 1, and is configured to receive and convey eggs. The eggs laid by the hens in the coop 1 fall onto the conveyor belt 2 from the bottom of the coop 1, and are conveyed along the conveyor belt 2. A plurality of coops 1 are disposed along a conveying direction of the conveyor belt 2.

The motor 4 is installed at one end of the conveyor belt 2, and the motor 4 drives the conveyor belt 2 to run. The machine-vision inspection device 3 is secured above a tail end of an output side of the conveyor belt 2. As shown in FIG. 2, the machine-vision inspection device 3 includes a semi-closed camera obscura 6, an opening at a lower end of the semi-closed camera obscura 6 covers the tail end of the output side of the conveyor belt 2, an inner top surface of the semi-closed camera obscura 6 is provided with the CCD camera 7 and a lighting device 8, a front end and a rear end, along the conveying direction of the conveyor belt 2, of the semi-closed camera obscura 6 are provided with an egg inlet and an egg outlet, respectively, and the eggs are conveyed by the conveyor belt 2 to freely enter and leave the machine-vision inspection device 3 through the inlet and the outlet.

The CCD camera 7 of the machine-vision inspection device 3 and the motor 4 are connected to the computer 5. The computer 5 controls the motor 4 to turn on regularly, triggers the CCD camera 7 to run an image processing program, processes and records the egg-laying performance (egg quantity, egg weight, and egg color) of a laying-hen at each coop/position.

A lens of the CCD camera 7 faces the conveyor belt directly downward for capturing an image of a surface of the conveyor belt 2. The lighting device 8 adopts a ring light source, and the CCD camera 7 is located in a center of the ring light source.

Embodiment of the Present Disclosure

As shown in FIG. 1, a conveyor belt 2 is installed below a coop 1 to receive an egg. The conveyor belt is 10 m long and made of white rubber with a smooth surface. The egg rolls onto the conveyor belt from a slide of the coop. A housing of a machine-vision inspection device 3 is made of an acrylic plate, a length and a width of the housing are the same as those of the conveyor belt, and a height of the housing is 15 cm. The housing is secured on a coop frame and located above a tail end of the conveyor belt 2. A CCD camera 7 is installed on an inner side of the top of the machine-vision inspection device 3, and a lens of the CCD camera faces the conveyor belt to obtain a clear image of the conveyor belt. A motor 4 is secured on a vertical support frame at one end of the coop to drive the conveyor belt 2 to run. Both the CCD camera 7 and the motor 4 are connected to a computer 5. The computer 5 is equipped with a third-party software program for controlling running of the motor and processing an image obtained and processed by the CCD camera. In addition, the computer 5 can save processed data and automatically export a corresponding table.

A specific implementation process of the present disclosure is as follows:

The eggs laid by the hens in the coop 1 fall onto the conveyor belt 2 from the bottom of the coop. After the hens in the coop 1 have laid all eggs, the conveyor belt 2 is activated, and the computer records the time of activating the conveyor belt 2. The conveyor belt 2 conveys the eggs to the machine-vision inspection device 3. After the eggs enter the machine-vision inspection device 3, the CCD camera 7 is triggered to capture an image of a surface of the conveyor belt carrying the eggs, and the computer records an egg arrival time and image information. Contours of the eggs in the image are obtained through image processing, a quantity of the eggs is statistically counted, and a coop position, a color, a size, and a weight are obtained for each egg through further analysis and processing, to realize real-time monitoring.

Figure 3:
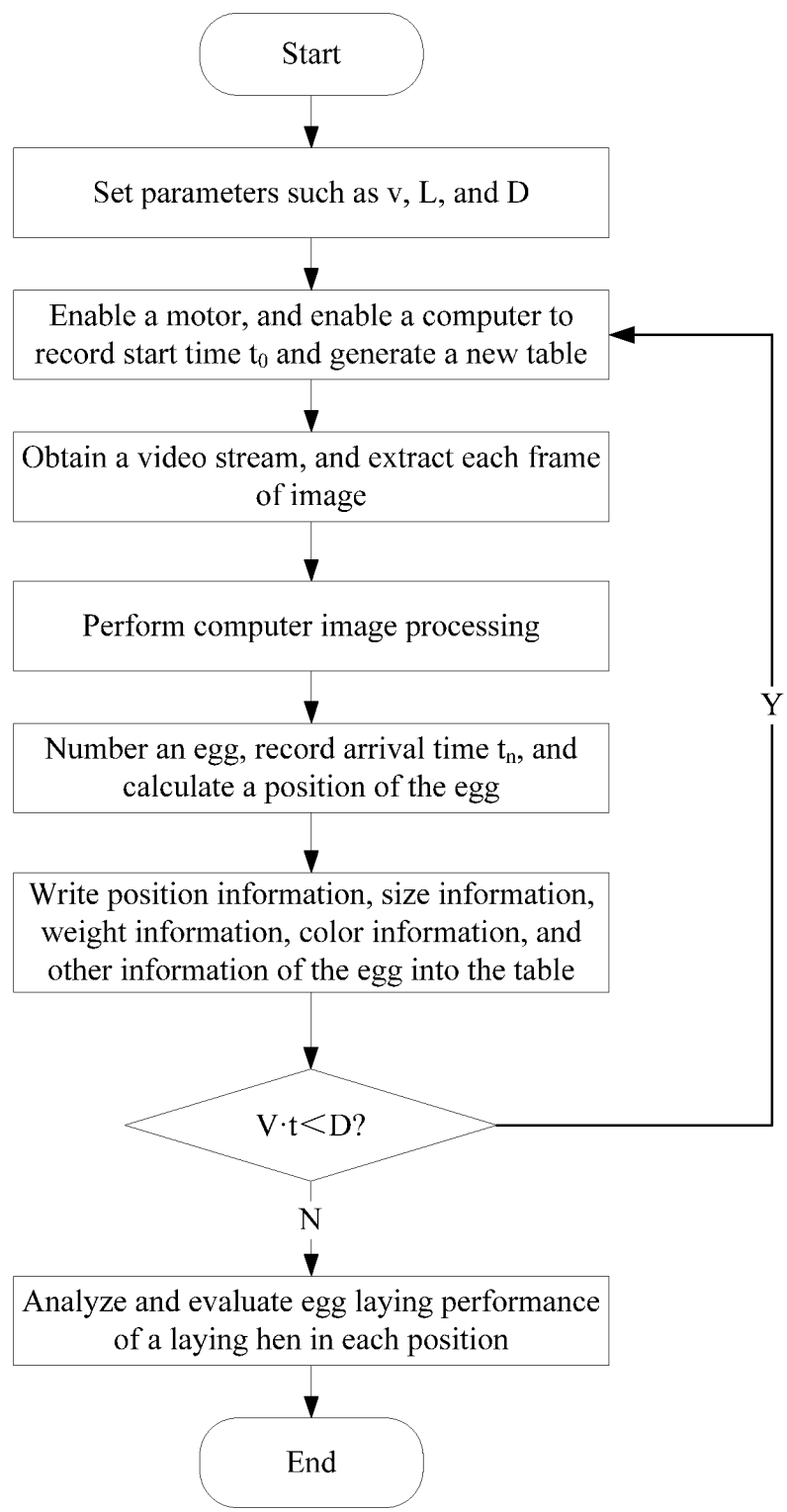
FIG. 3 is an overall flowchart according to the present disclosure.
Figure 4:
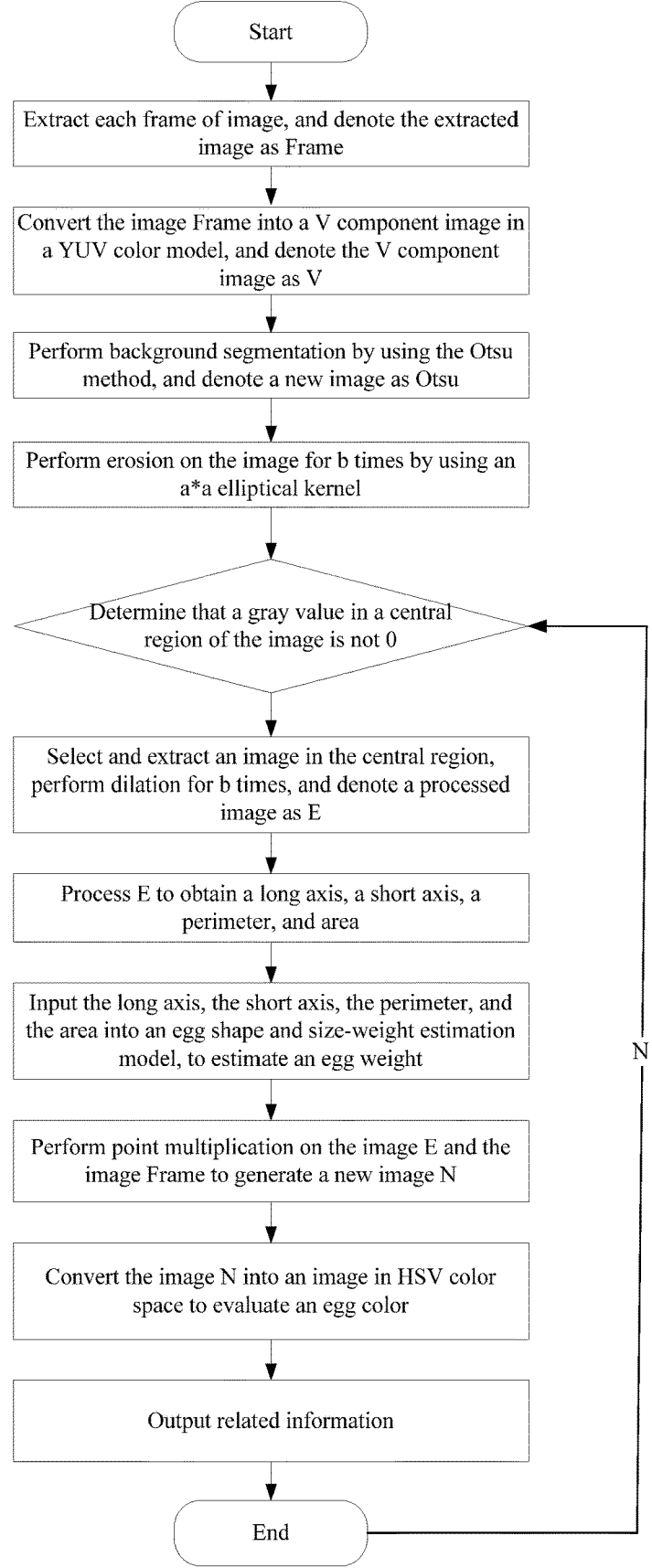
FIG. 4 is a flowchart of an egg image processing and feature recognition algorithm according to the present disclosure.

As shown in FIG. 3, when the conveyor belt 2 is activated, the CCD camera 7 starts to collect the image. A running speed of the conveyor belt is set as v, a length of a single coop/position is set as L, a total length of a row of coops is set as D, and real-time time is set as t. The computer performs computer image processing on a video stream obtained by the CCD camera and forms a table. An image processing method in FIG. 4 is called in real time for image analysis and processing to detect contours of the eggs and obtain egg information. A contour of one egg is used as an egg. When it is detected that an egg arrives at a middle position of the image (in other words, each gray value of a 3*3 central pixel region of the image is not 0), in other words, when the egg arrives a position directly under the camera, the egg is numbered from 0 to n, the current time to is recorded as the egg arrival time, and the obtained egg information is recorded in the table.

When it is detected that an $n^{th}$ egg passes by, a coop position x of the $n^{th}$ egg is obtained based on the egg arrival time to according to the following formula:

$$x = \left\lceil \frac{v \cdot (t_n - t_0)}{L} \right\rceil$$

where v represents the running speed of the conveyor belt 2, L represents the length of a single coop, $t_0$ represents the initial running time of the conveyor belt 2, and ⌈ ⌉ represents rounding up.

Through the above processing, a coop position x of each egg can be obtained. After the coop position x of the egg is determined, a color, a size, a weight, and other data of each egg at each coop position x are collected to perform monitoring.

An egg image processing and feature recognition method in the present disclosure is described below with reference to FIG. 4.

At first, the CCD camera 7 is used to obtain a video stream, each frame is extracted as an original image for processing, RGB color space of the image is converted into a V component in YUV color space, noise reduction is performed on the image, and then background segmentation and binarization are performed by the Otsu's method, to determine whether there is an egg. If the image is completely black, it is determined that there is no egg; or if the image is not completely black, it is determined that there is an egg.

Next, an Otsu image containing an egg is extracted, and erosion is performed for b times using an a*a elliptical kernel.

Then, a judgement is performed on an eroded image by the following step: if each gray value of a 3*3 central pixel region of the image is not 0, a bounding rectangle whose gray value is not 0 is selected and extracted as a local image region; and dilation is performed on the local image region for b times by using the same a*a elliptical kernel, to obtain an intermediate image E.

Finally, shape and size information of the intermediate image E is obtained. Specifically, the intermediate image E is processed by using an MBR method, to establish an MBR of a contour of the egg, a major axis and a minor axis of the MBR are used as a major axis and a minor axis of the egg, respectively, to obtain lengths of the major axis and the minor axis of the egg, an edge contour of the egg image is obtained by using a cv2.findContours( ) function of openCV, the current image is denoted as an image F, a perimeter of the egg is extracted by using a cv.arcLength( ) function, and an area of the egg is obtained by using a cv.contourArea( ) function. The lengths of the major axis and the minor axis, the perimeter, and the area of the egg are input into the following egg shape and size-weight estimation model, to obtain a weight of the egg:

$$W = \rho h^2 l + \mu(C - 2l)hl + \tau Sh + \psi$$

Pixel-wise multiplication is performed on the intermediate image E and the original image Frame, a region of the egg in the image is extracted, color information of the egg is obtained, and then color recognition is performed based on the color information of the egg in the HSV color space to realize color grading.

Normal egg-laying parameters are determined based on a known egg-laying condition, a quantity of eggs at each coop position x, a weight of each egg, and a color of each egg are compared with the normal egg-laying parameters, and then the egg-laying performance of laying-hens at each position is monitored to determine the egg-laying performance and a health status of the laying-hens at each coop position.

Sometimes, a dead hen at a coop/position may not be found and separated in time, especially when the coop is located higher from the ground. When it is found that egg production at a position is significantly reduced, there may be a dead hen at the position, so as to remind breeders to separate the dead hen from the position.

In short, egg-laying information of the laying-hen at each coop/position is compared with that under a normal condition. In this way, the egg-laying performance and a health report of the laying-hen at each position can be provided for the breeders, to help the breeders improve breeding efficiency and find a problem in a breeding process in time.

What is claimed is:

1. A method for monitoring an egg-laying performance of caged laying-hens at laying-hen positions, comprising:
    disposing a plurality of coops side by side, and disposing a conveyor belt below the plurality of coops, wherein a conveying direction of the conveyor belt is along a direction of disposing the plurality of coops side by side, a machine-vision inspection device is secured on an output end of the conveyor belt, a charge-coupled device (CCD) camera and a lighting device are installed in the machine-vision inspection device, both the CCD camera and the lighting device are located above the conveyor belt and face the conveyor belt, a motor drives the conveyor belt to run, and the motor and the CCD camera are connected to a computer;
    allowing eggs laid by hens in the plurality of coops to fall onto the conveyor belt from a bottom of the plurality of coops, and
    after the hens in the plurality of coops have laid all eggs, activating the conveyor belt, recording a time of activating the conveyor belt, and conveying, by the conveyor belt, the eggs to the machine-vision inspection device; and
    after the eggs enter the machine-vision inspection device, triggering the CCD camera to capture an image of a surface of the conveyor belt carrying the eggs, obtaining contours of the eggs in the image through image processing, statistically counting a quantity of the eggs, and obtaining a coop position, a color, a size, and a weight for each egg through further analysis and processing, to implement real-time monitoring;
    wherein the method further comprises:
    when the conveyor belt is activated, starting the CCD camera to collect the image, detecting the contours of the eggs through real-time image analysis and processing, numbering an egg when it is detected that an egg reaches a middle position of the image, and recording a current time $t_n$ as an egg arrival time; and
    when it is detected that an $n^{th}$ egg passes by, obtaining a coop position x of the $n^{th}$ egg based on the egg arrival time to according to the following formula:

$$x = \left\lceil \frac{v \cdot (t_n - t_0)}{L} \right\rceil$$

wherein v represents a running speed of the conveyor belt, L represents a length of a single coop, $t_0$ represents an initial running time of the conveyor belt, and Π represents rounding up.

2. The method for monitoring the egg-laying performance of the caged laying-hens at the laying-hen positions according to claim 1, further comprising:

using the CCD camera to obtain a video stream, extracting each frame as an original image for processing, converting RGB color space of the image into a V component in YUV color space, performing noise reduction on the image, and then performing background segmentation and binarization by an Otsu's method, to determine whether there is an egg: if the image is completely black, determining that there is no egg, or if the image is not completely black, determining that there is an egg;

extracting an Otsu image containing an egg, and performing erosion for b times using an a*a elliptical kernel;

performing a judgement on the eroded image by the following step: if each gray value of a 3*3 central pixel region of the image is not 0, selecting and extracting a bounding rectangle whose gray value is not 0 as a local image region; and performing dilation on the local image region for b times by using the same a*a elliptical kernel, to obtain an intermediate image E; and obtaining shape and size information of the intermediate image E by the following steps:

processing the intermediate image E by using a minimum bounding rectangle (MBR) method, to establish an MBR of a contour of an egg, using a major axis and a minor axis of the MBR as a major axis and a minor axis of the egg, respectively, to obtain lengths of the major axis and the minor axis of the egg, and then inputting the lengths of the major axis and the minor axis, a perimeter, and an area of the egg into a following egg shape and size-weight estimation model, to obtain a weight of the egg:

$$W = \rho h^2 l + \mu(C - 2l)hl + \tau Sh + \psi$$

wherein W represents an estimated weight of the egg; h represents the length of the minor axis of the egg; l represents the length of the major axis of the egg; C represents the obtained perimeter of the egg, S represents the obtained area of the egg; and ρ, μ, τ, and ψ represent model parameters of a first term, a second term, a third term, and a fourth term, respectively.

3. The method for monitoring the egg-laying performance of the caged laying-hens at the laying-hen positions according to claim 2, comprising: performing pixel-wise multiplication on the intermediate image E and the original image Frame, extracting a region of the egg in the image, obtaining color information of the egg, and then performing color recognition based on the color information of the egg in HSV color space to implement color grading.

4. The method for monitoring the egg-laying performance of the caged laying-hens at the laying-hen positions according to claim 1, further comprising:

determining normal egg-laying parameters based on a known egg-laying condition, comparing a quantity of eggs at each coop position x, a weight of each egg, and a color of each egg with the normal egg-laying parameters, and then monitoring-an egg-laying performance of laying-hens at the each position, to determine the egg-laying performance and a health status of the laying-hens at the each coop position.

5. The method for monitoring the egg-laying performance of the caged laying-hens at the laying-hen positions according to claim 4, wherein using the CCD camera to obtain a video stream, extracting each frame as an original image for processing, converting RGB color space of the image into a V component in YUV color space, performing noise reduction on the image, and then performing background segmentation and binarization by an Otsu's method, to determine whether there is an egg: if the image is completely black, determining that there is no egg, or if the image is not completely black, determining that there is an egg;

extracting an Otsu image containing an egg, and performing erosion for b times using an a*a elliptical kernel;

performing a judgement on the eroded image by the following step: if each gray value of a 3*3 central pixel region of the image is not 0, selecting and extracting a bounding rectangle whose gray value is not 0 as a local image region; and performing dilation on the local image region for b times by using the same a*a elliptical kernel, to obtain an intermediate image E; and obtaining shape and size information of the intermediate image E by the following steps:

processing the intermediate image E by using a minimum bounding rectangle (MBR) method, to establish an MBR of a contour of an egg, using a major axis and a minor axis of the MBR as a major axis and a minor axis of the egg, respectively, to obtain lengths of the major axis and the minor axis of the egg, and then inputting the lengths of the major axis and the minor axis, a perimeter, and an area of the egg into a following egg shape and size-weight estimation model, to obtain a weight of the egg $$W = \rho h^2 l + \mu(C - 2l)hl + \tau Sh + \psi$$

wherein W represents an estimated weight of the egg; h represents the length of the minor axis of the egg; l represents the length of the major axis of the egg; C represents the obtained perimeter of the egg, S represents the obtained area of the egg; and ρ, μ, τ, and ψ represent model parameters of a first term, a second term, a third term, and a fourth term, respectively.

6. The method for monitoring the egg-laying performance of the caged laying-hens at the laying-hen positions according to claim 5, wherein performing pixel-wise multiplication on the intermediate image E and the original image Frame, extracting a region of the egg in the image, obtaining color information of the egg, and then performing color recognition based on the color information of the egg in HSV color space to implement color grading.

7. The method for monitoring the egg-laying performance of the caged laying-hens at the laying-hen positions according to claim 1, wherein the conveyor belt runs at a constant speed.

8. A system for monitoring an egg-laying performance of caged laying-hens at laying-hen positions by using the method of claim 1, comprising: a coop, a conveyor belt, a machine-vision inspection device, a CCD camera, and a motor, wherein the coop is located above the conveyor belt, the conveyor belt is configured to receive and convey eggs, the eggs laid by the hens in the coop fall onto the conveyor belt from a bottom of the coop, and are conveyed along the conveyor belt, the motor is installed at an end of the conveyor belt, the machine-vision inspection device is secured above a tail end of an output side of the conveyor belt, the machine-vision inspection device comprises a semi-closed camera obscura, wherein an opening at a lower end of the semi-closed camera obscura covers the tail end of the output side of the conveyor belt, an inner top surface of the semi-closed camera obscura is provided with the CCD camera and a lighting device, a front end and a rear end, along a conveying direction of the conveyor belt, of the semi-closed camera obscura are provided with an egg inlet and an egg outlet, respectively, and the eggs are conveyed by the conveyor belt to freely enter and leave the machine-vision inspection device through the inlet and the outlet.

9. The system for monitoring the egg-laying performance of the caged laying-hens at the laying-hen positions according to claim 8, further comprising: a computer, wherein both the CCD camera of the machine-vision inspection device and the motor are connected to the computer.

10. The system for monitoring the egg-laying performance of the caged laying-hens at the laying-hen positions according to claim 8, wherein a lens of the CCD camera faces directly downward for capturing an image of a surface of the conveyor belt; and the lighting device adopts a ring light source, and the CCD camera is located in a center of the ring light source.

11. The system for monitoring the egg-laying performance of the caged laying-hens at the laying-hen positions according to claim 8, wherein a plurality of coops are disposed along the conveying direction of the conveyor belt.

\* \* \* \* \*